(12) United States Patent
Narioka et al.

(10) Patent No.: US 12,175,170 B2
(45) Date of Patent: Dec. 24, 2024

(54) SIMULATION METHOD, SIMULATION DEVICE, AND STORAGE DEVICE

(71) Applicant: CANON KABUSHIKI KAISHA, Tokyo (JP)

(72) Inventors: Shintaro Narioka, Tokyo (JP); Yuichiro Oguchi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 710 days.

(21) Appl. No.: 17/101,064

(22) Filed: Nov. 23, 2020

(65) Prior Publication Data
US 2021/0192107 A1 Jun. 24, 2021

(30) Foreign Application Priority Data
Dec. 24, 2019 (JP) .................................. 2019-233215

(51) Int. Cl.
| | | |
|---|---|---|
| *G06F 30/20* | (2020.01) | |
| *G03F 7/00* | (2006.01) | |
| *G06F 16/25* | (2019.01) | |
| *G06F 113/22* | (2020.01) | |

(52) U.S. Cl.
CPC ............ *G06F 30/20* (2020.01); *G03F 7/0002* (2013.01); *G06F 16/252* (2019.01); *G06F 2113/22* (2020.01)

(58) Field of Classification Search
CPC ...... G06F 30/20; G06F 16/252; G06F 7/0002; G06F 2113/22
USPC ............................................................ 703/6
See application file for complete search history.

(56) References Cited

U.S. PATENT DOCUMENTS

| | | | |
|---|---|---|---|
| 9,201,990 B2 | 12/2015 | Wakamatsu | |
| 2014/0131313 A1* | 5/2014 | Wakamatsu | ............ G06F 30/20 703/2 |

FOREIGN PATENT DOCUMENTS

| | | |
|---|---|---|
| JP | 2012212833 A | 11/2012 |
| JP | 5599356 B2 | 10/2014 |

OTHER PUBLICATIONS

Harris_1998 (Nonlinear Least-Squares Curve Fitting with Microsoft Excel Solver, JChemEd.Chem.Wisc.edu vol. 75 No. Jan. 1, 1998 Journal of Chemical Education). (Year: 1998).*
Liang_2007 (Air bubble formation and dissolution in dispensing nanoimprint lithography, 2007 Nanotechnology 18 025303) (Year: 2007).*

(Continued)

*Primary Examiner* — Brian S Cook
(74) *Attorney, Agent, or Firm* — ROSSI, KIMMS & McDOWELL LLP

(57) ABSTRACT

In order to provide an efficient and favorable simulation method for obtaining the disappearance of a number of air bubbles in one entire shot or the like, for example, there is provided a simulation method for simulating a film forming process of forming a film by coating an upper part of a substrate with a curable composition in a form of a plurality of droplets and bringing a mold into contact therewith. The simulation method includes a first step of computing a size of each air bubble at a time when air bubbles become trapped due to the mold brought into contact therewith and a time of becoming trapped, and a second step of obtaining a disappearing process of each of the air bubbles on the basis of information of the size of each of the air bubbles and the time.

19 Claims, 11 Drawing Sheets

(56) References Cited

OTHER PUBLICATIONS

Liang. "Air bubble formation and dissolution in dispensing nanoimprint lithography." Nanotechnology. 2007: 1-7. 025303. vol. 18.
Office Action issued in Korean Appln. No. 10-2020-0174173, mailed May 17, 2024. English translation provided.

* cited by examiner

SIMULATION METHOD, SIMULATION DEVICE, AND STORAGE DEVICE

BACKGROUND OF THE INVENTION

Field of the Invention

The present invention relates to a simulation method and the like.

Description of the Related Art

There is a film forming method for forming a film constituted of a cured product of a curable composition on a substrate by disposing the curable composition on the substrate, bringing the curable composition and a mold into contact with each other, and curing the curable composition with light, heat, or the like. Such a film forming method may be applied to an imprinting method, a flattening method, and the like. In an imprinting method, a mold having a pattern is used and the pattern of the mold is transferred to a curable composition on a substrate. In a flattening method, a mold having a flat surface is used and a film having a flat upper surface is formed by bringing a curable composition on a substrate and the flat surface into contact with each other and curing the curable composition.

The curable composition is disposed on the substrate in a state of droplets. Thereafter, the droplets of the curable composition on the substrate are pressed with the mold. Accordingly, the droplets are dispersed and a film of the curable composition is formed. In such processing, it is important that a film of a curable composition having a uniform thickness is formed and there are no air bubbles in the film. In order to realize this, the disposition of the droplets, a method and conditions for pressing droplets with a mold, and the like are adjusted. A large amount of time and high costs are incurred in order to realize such adjustment through a process of trial and error entailing formation of a film using a film forming device. Hence, it is desired to introduce a simulator for assisting such adjustment.

When a film is formed of dispersed droplets, gas is trapped between the droplets and becomes air bubbles in a film of a curable composition. Air bubbles in a film dissolve, disperse, and eventually disappear in a mask and the film. However, if air bubbles do not disappear until mold release, there is concern that they may cause so called air bubble defects. The number of air bubbles in the entire film of one shot is approximately the same as the number of droplets, that is substantially tens of thousands of air bubbles. For this reason, for example, in order to estimate the occurrence of air bubble defects in one entire shot, there is a need to calculate dissolution and dispersion of tens of thousands of air bubbles.

Japanese Patent No. 5599356 describes a simulation method for estimating wet-dispersion and unification of a plurality of droplets using gas-liquid two phase flow analysis. Here, a situation in which tens of gas bubbles are trapped is disclosed in the diagram but a simulation method for efficiently calculating the disappearance of a number of air bubbles is not disclosed.

In addition, Nanotechnology Vol. 18 (025303 (2007), Xiaogan Liang et al) discloses calculation for a process until only one air bubble disappears.

However, air bubbles dissolving and dispersing only in a film of a curable composition has been considered, but dissolution and dispersion with respect to a mask have not been taken into consideration. In addition, a simulation method for efficiently calculating the disappearance of a number of air bubbles has not been disclosed.

That is, in a calculation method in the related art, there is a problem that it may not be realistic to calculate the disappearance of a number of air bubbles for one shot, for example, in which dissolution and dispersion, and the like in a mask are taken into consideration, for example, because a long calculation time is required.

Hence, an object of the present invention is to provide a favorable simulation method for efficiently calculating the disappearance of a number of air bubbles.

SUMMARY OF THE INVENTION

The present invention provides a simulation method for a film forming process of forming a film by coating an upper part of a substrate with a curable composition in a form of a plurality of droplets and bringing a mold into contact therewith. The simulation method includes a first step of computing a size of each air bubble at a time when air bubbles become trapped due to the mold brought into contact therewith and a time of becoming trapped, and a second step of obtaining a disappearing process of each of the air bubbles on the basis of information of the size of each of the air bubbles and the time.

Further features of the present invention will become apparent from the following description of exemplary embodiments with reference to the attached drawings.

BRIEF DESCRIPTION OF THE DRAWINGS

FIG. 1 is a view for describing an example of calculation grid cells.

In FIGS. 3A to 3E, upper stages show substantially side views, and lower stages show substantially top views. As sequentially shown in FIGS. 3A to 3E, a mask moves downward toward droplets discharged on a substrate.

FIG. 7 is a view for describing the air bubble disappearance database.

DESCRIPTION OF THE EMBODIMENTS

Hereinafter, with reference to the accompanying drawings, favorable embodiments of the present invention will be described using Examples. In each diagram, the same reference signs are applied to the same members or elements, and duplicate description will be omitted or simplified.

FIG. 1 is a view for describing an example of calculation grid cells. A typical size of calculation grid cells in a case in which dissolution and dispersion of air bubbles in one entire shot are calculated by dividing into calculation grid cells using a general method will be described with reference to FIG. 1.

Figure 1A:
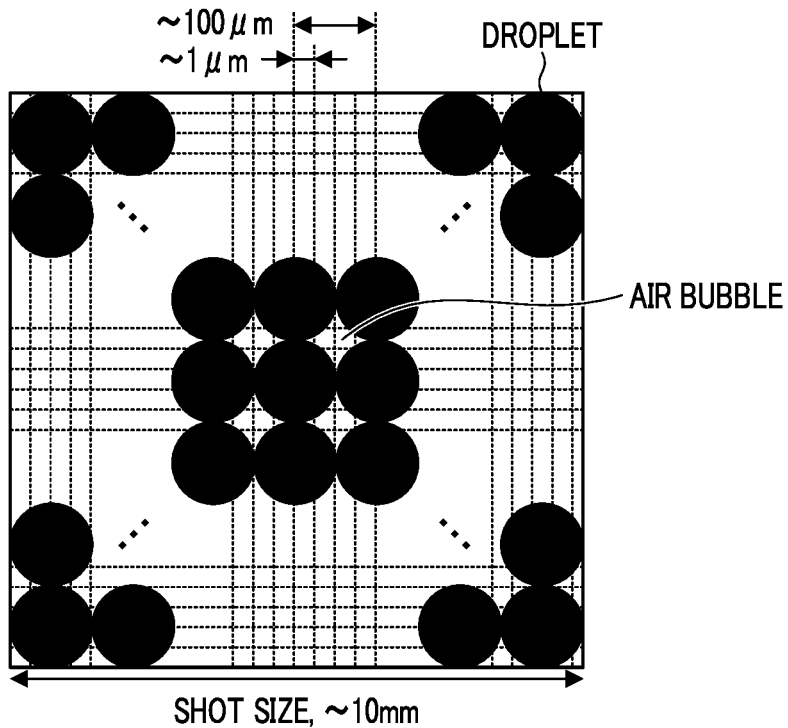
FIG. 1A shows an example in which droplets are disposed within a plane in an XY direction.

FIG. 1A shows an example in which droplets are disposed within a plane in an XY direction, and the droplets are generally discharged at intervals of approximately 100 µm.

Figure 1B:
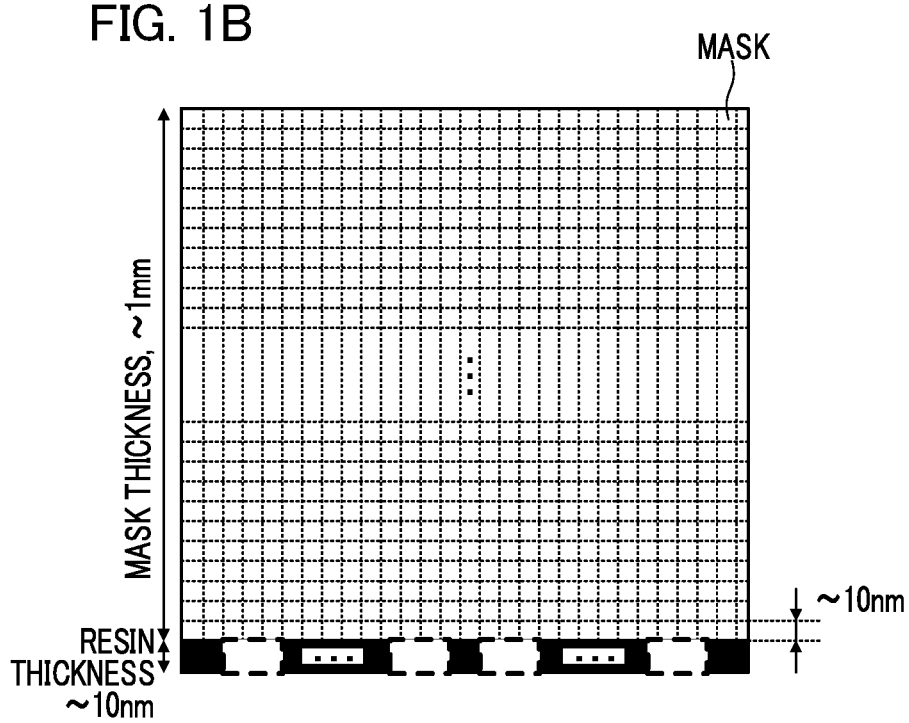
FIG. 1B is a view showing calculation grid cells in a Z direction perpendicular to the XY direction.

In order to analyze an image of air bubbles trapped between these droplets, there is a need to divide the droplets into calculation grid cells with intervals of approximately 1 µm in the XY direction. In addition, FIG. 1B is a view showing calculation grid cells in a Z direction perpendicular to the XY direction. As shown in FIG. 1B, in order to calculate a situation in a mask in which gas disperses in a thickness direction (Z direction) thereof, for instance, if only one calculation grid cell is applied for a curable composition, a large number of grid cells are required to divide up the calculation grid cells to a side opposite to the mask with a uniform calculation grid cell width.

For this reason, in an ordinary method, there is concern that a calculation time may not come within a realistic range.

In contrast, according to Examples which will be described below, efficiency of calculation is raised, and thus it is possible to realize a favorable simulation method for calculating the disappearance of a number of air bubbles in one entire shot, for example.

Example 1

Figure 2:
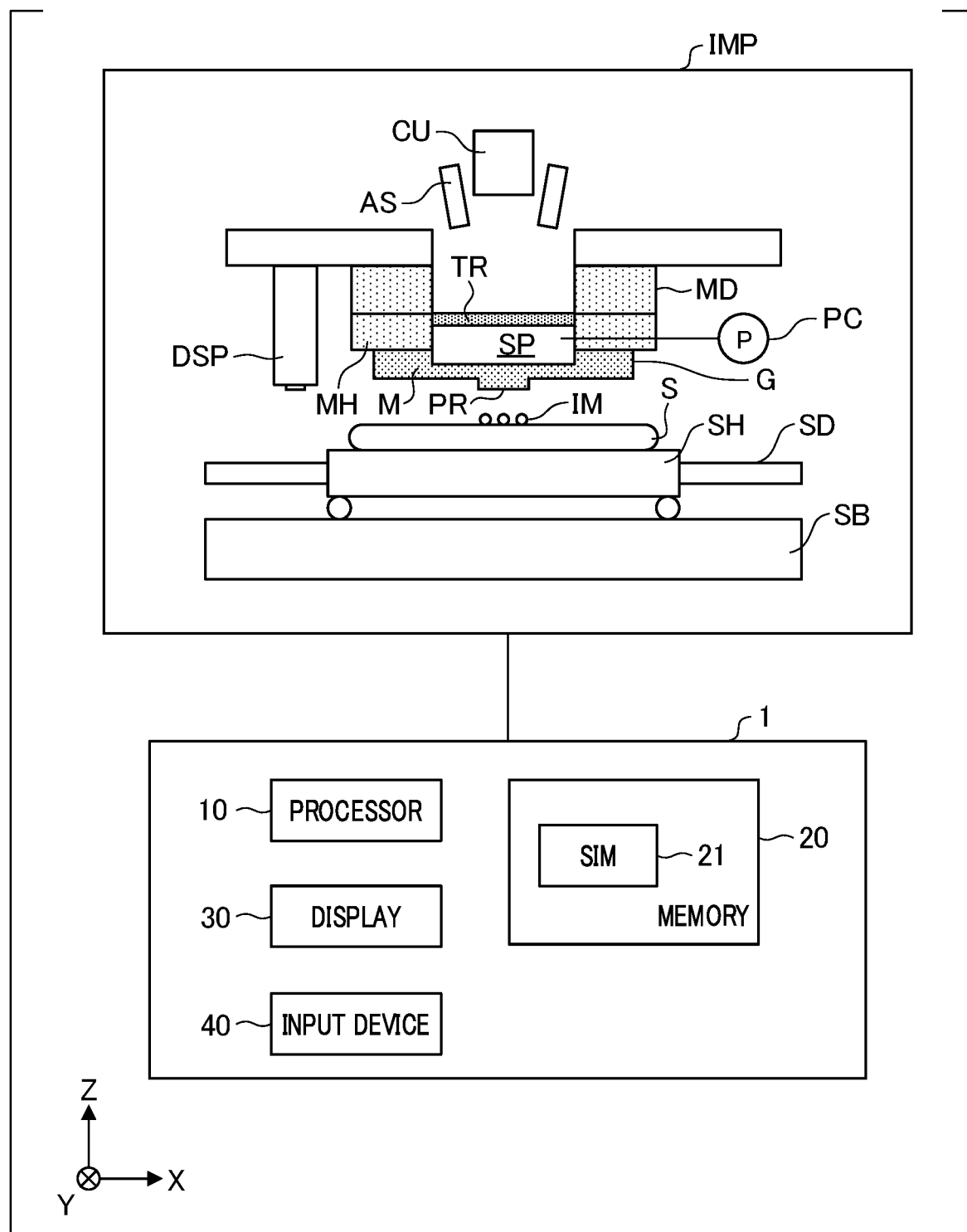
FIG. 2 is a view showing a configuration of a film forming device and a simulation device in Example 1.

FIG. 2 is a view showing a configuration of a film forming device IMP and a simulation device 1 in Example 1. The film forming device IMP executes processing in which a plurality of droplets of a curable composition IM disposed on a substrate S and a mold M are brought into contact with each other and a film of the curable composition IM is formed in a space between the substrate S and the mold M. For example, the film forming device IMP may be constituted as an imprinting device or may be constituted as a flattening device. Here, the substrate S and the mold M can be interchanged. A plurality of droplets of the curable composition IM disposed on the mold M and the substrate S may be brought into contact with each other and a film of the curable composition IM may be formed in a space between the mold M and the substrate S.

Therefore, more comprehensively, the film forming device IMP is a device executing processing in which a plurality of droplets of the curable composition IM disposed on a first member and a second member are brought into contact with each other and a film of the curable composition IM is formed in a space between the first member and the second member. Hereinafter, an example in which the first member is the substrate S and the second member is the mold M will be described, but the first member may become the mold M and the second member may become the substrate S. In this case, the substrate S and the mold M in the following description may be interchanged.

In the imprinting device, the mold M having a pattern is used so that the pattern of the mold M may be transferred to the curable composition IM on the substrate S. In the imprinting device, the mold M having a pattern region PR provided with a pattern is used. In the imprinting device, the curable composition IM on the substrate S and the pattern region PR of the mold M are brought into contact with each other, and a space between a region in which a pattern of the substrate S is to be formed and the mold M is filled with the curable composition. Thereafter, the curable composition IM is cured. Accordingly, the pattern in the pattern region PR of the mold M is transferred to the curable composition IM on the substrate S. In the imprinting device, for example, a pattern constituted of a cured product of the curable composition IM is formed on each of a plurality of shot regions of the substrate S.

In the flattening device, the mold M having a flat surface is used so that the curable composition IM on the substrate S and the flat surface are brought into contact with each other and the curable composition IM is cured, thereby forming a film having a flat upper surface. In the flattening device, generally, the mold M having a size capable of covering the entire region of the substrate S is used, and a film constituted of a cured product of the curable composition IM is formed in the entire region of the substrate S.

Regarding the curable composition, a material which is cured when a curing energy is applied thereto is used. Regarding a curing energy, electromagnetic waves, heat, or the like may be used. For example, regarding electromagnetic waves, light having a wavelength selected from a range of 10 nm to 1 mm, for example, infrared rays, visible rays, ultraviolet rays, or the like, are used.

The curable composition may be a composition which is cured due to irradiation with light or heating. Between these, a light curable composition which is cured due to irradiation with light contains at least a polymerizable compound and a photopolymerization initiator, and as necessary, it may further contain a non-polymerizable compound or a solvent. A non-polymerizable compound is at least one selected from the group consisting of a sensitizer, a hydrogen donor, an internal mold release agent, a surfactant, an oxidation inhibitor, a polymer component, and the like. A viscosity (viscosity at 25° C.) of the curable composition may be within a range of 1 mPa·s to 100 mPa·s, for example. Regarding a material of the substrate, a glass, a ceramic, a metal, a semiconductor, a resin or the like is used, for example. As necessary, a member constituted of a material different from that of the substrate may be provided on a surface of the substrate.

The substrate is a silicon wafer, a compound semiconductor wafer, or a quartz glass, for example.

In this specification and the accompanying drawings, directions will be described in an XYZ coordinate system having an XY plane lying in a direction parallel to the surface of the substrate S. In the XYZ coordinate system, directions parallel to an X axis, a Y axis, and a Z axis are referred to as an X direction, a Y direction, and a Z direction respectively, and rotation around the X axis, rotation around the Y axis, and rotation around the Z axis are referred to as θX, θY, and θZ respectively. Controlling or driving related to the X axis, the Y axis, and the Z axis denotes controlling or driving related to a direction parallel to the X axis, a direction parallel to the Y axis, and a direction parallel to the Z axis respectively.

In addition, controlling or driving related to the θX axis, the θY axis, and the θZ axis denotes controlling or driving related to rotation around an axis parallel to the X axis, rotation around an axis parallel to the Y axis, and rotation around an axis parallel to the Z axis respectively. In addition, a position is information which may be identified on the basis of the coordinates of the X axis, the Y axis, and the Z axis, and a posture is information which may be identified by values of the θX axis, the θY axis, and the θZ axis. Positioning denotes controlling of a position and/or a posture.

The film forming device IMP includes a substrate holding portion SH holding the substrate S, a substrate driving mechanism SD driving the substrate S by driving the substrate holding portion SH, and a support base SB supporting the substrate driving mechanism SD.

In addition, the film forming device IMP includes a mold holding portion MH holding the mold M, and a mold driving mechanism MD driving the mold M by driving the mold holding portion MH. The substrate driving mechanism SD and the mold driving mechanism MD constitute a relative driving mechanism for driving at least one of the substrate S and the mold M such that relative positions of the substrate S and the mold M are adjusted. Adjustment of the relative positions performed by the relative driving mechanism includes bringing the curable composition IM on the substrate S and the mold M into contact with each other and driving for separating the mold M from the cured curable composition IM.

In addition, adjustment of the relative positions performed by the relative driving mechanism includes positional alignment between the substrate S and the mold M. The substrate driving mechanism SD is configured to drive the substrate S along a plurality of axes (for example, three axes such as the X axis, the Y axis, and the θZ axis, and preferably six axes such as the X axis, the Y axis, the Z axis, the θX axis, the θY axis, and the θZ axis).

The mold driving mechanism MD is configured to drive the mold M along a plurality of axes (for example, three axes such as the Z axis, the θX axis, and the θY axis, and preferably six axes such as the X axis, the Y axis, the Z axis, the θX axis, the θY axis, and the θZ axis).

The film forming device IMP includes a curing portion CU for curing the curable composition IM with which the space between the substrate S and the mold M is filled. For example, in the curing portion CU, the curable composition IM is irradiated with a curing energy via the mold M. Accordingly, the curable composition IM is cured. The film forming device IMP includes a transmission member TR for forming a space SP on a rear surface side (a side opposite to a surface facing the substrate S) of the mold M. The transmission member TR is constituted of a material which allows a curing energy from the curing portion CU to be transmitted therethrough. Accordingly, the curable composition IM can be irradiated with a curing energy.

The film forming device IMP includes a pressure control portion PC controlling deformation of the mold M in the Z axis direction by controlling the pressure in the space SP. For example, when the pressure control portion PC raises the pressure in the space SP to be higher than atmospheric pressure, the mold M is deformed into a shape projected toward the substrate S.

The film forming device IMP includes a dispenser DSP for disposing, supplying, or distributing the curable composition IM on the substrate S. The substrate S in which the curable composition IM is disposed may be supplied to the film forming device IMP by a different device. In this case, the dispenser DSP may not be included in the film forming device IMP.

The film forming device IMP may include an alignment scope AS for measuring a positional alignment error between the substrate S (or the shot region of the substrate S) and the mold M.

The simulation device 1 executes calculation for estimating the behavior of the curable composition IM in processing executed by the film forming device IMP.

More specifically, the simulation device 1 executes calculation for estimating the behavior of the curable composition IM in processing in which a plurality of droplets of the curable composition IM disposed on the substrate S and the mold M are brought into contact with each other and a film of the curable composition IM is formed in a space between the substrate S and the mold M.

For example, the simulation device 1 functions in a manner of executing the simulation method by installing a simulation computer program 21 in a general computer or a dedicated computer.

Alternatively, the simulation device 1 may be constituted of a programmable logic device (abbreviated as PLD) such as a field programmable gate array (abbreviated as FPGA), or an application specific integrated circuit (abbreviated as ASIC). In the present Example, the simulation device 1 includes a processor 10 serving as a computer, a memory 20, a display 30, and an input device 40, and the simulation computer program 21 is stored in the memory 20.

The memory 20 may be a semiconductor memory, may be a disk such as a hard disk, or may be a memory in a different form. The simulation computer program 21 is stored in a computer readable memory medium. Alternatively, the simulation computer program 21 is provided to the simulation device 1 via communication equipment such as an electric telecommunication line.

The behavior of air bubbles from generation to disappearance will be described with reference to FIG. 3. For the sake of convenience of illustration, merely several droplets and air bubbles are shown, but tens of thousands of droplets and air bubbles are present actually. In FIGS. 3A to 3E, upper stages show substantially side views, and lower stages show substantially top views. As sequentially shown in FIGS. 3A to 3E, a mask moves downward toward droplets discharged on a substrate.

After the mask starts to come into contact with the droplets, the droplets are pressed and dispersed by the mask. When the droplets which have been pressed and dispersed start to come into contact with adjacent droplets and gas is trapped therebetween, air bubbles are formed. Thereafter, as the mask further moves downward, the air bubbles start to be compressed. At the same time, the gas inside the air bubbles trapped between the droplets disperse in a surrounding medium such as the mask, and the amount thereof, that is, the number of molecules therein decreases gradually. When all the trapped gas has dispersed, the air bubbles disappear.

In this manner, in the present Example, as shown in FIG. 3, a film forming process of forming a film is executed by coating an upper part of a substrate with a curable composition in a form of a plurality of droplets and bringing a mold into contact therewith. In addition, here, the film forming process includes an imprinting process or a flattening process.

The total number n of molecules of the gas inside the air bubbles is expressed by the following Expression 1 using a state equation of an ideal gas.

$$n = \frac{pV}{RT} \qquad \text{[Expression 1]}$$

Here, p indicates an air bubble pressure, V indicates an air bubble volume, R indicates a gas constant, and T indicates a temperature. It is ascertained that a total number n of molecules inside the air bubbles is expressed using the air bubble pressure p and the air bubble volume V. Here, the total number n of molecules of the gas inside the air bubbles corresponds to the size of the air bubbles at the time when the air bubbles are trapped by the mold which has been brought into contact therewith.

Here, the air bubble pressure p and the air bubble volume V will be considered. On the assumption that the air bubbles have a columnar shape, the air bubble volume V is expressed by the following Expression 2 using an air bubble radius r and a mask height h.

$$V = \pi r^2 \cdot h \qquad \text{[Expression 2]}$$

Figure 4:
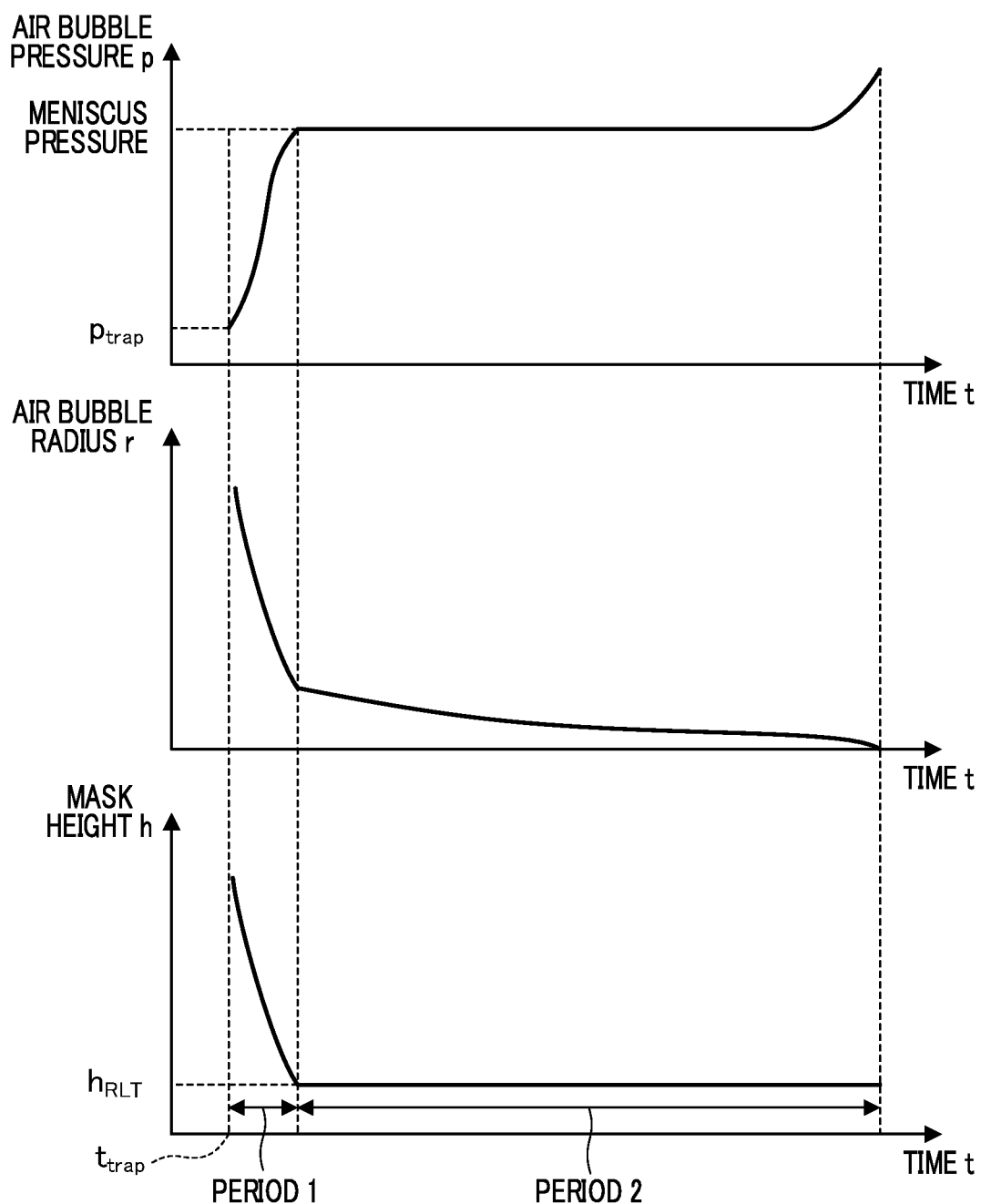
FIG. 4 is a view schematically showing behavior at the time of disappearance of air bubbles.

FIG. 4 is a view showing the behavior of the air bubble pressure p, the air bubble radius r, and the mask height h at the time of disappearance of the air bubbles. The horizontal axis indicates times starting from a time immediately before the mask comes into contact with the droplets. The droplets which have been pressed and dispersed by the mold (mask) come into contact with adjacent droplets and cause gas to be trapped between the droplets, and air bubbles are formed. This time is referred to as ttrap.

In addition, when the air bubble pressure and the air bubble volume at this time are referred to as ptrap and Vtrap respectively, a number ntrap of molecules in the air bubbles at the time ttrap is obtained by Expression 1.

The air bubbles trapped between the droplets are suddenly compressed due to a meniscus pressure caused by the surface tension of a liquid, the air bubble radius r and the mask height h decrease suddenly at this time, and the air bubble pressure p increases suddenly. This period will hereinafter be referred to as a period 1. When the air bubble pressure p rises to an extent that is approximately the same as the meniscus pressure, sudden decrease of the air bubble radius is alleviated.

At this time, the mask height h has almost reached hRLT which is an ultimate liquid film thickness. Thereafter, the air bubble radius decreases gradually by the amount of the gas inside the air bubbles which has dispersed in the surrounding medium, thereby resulting in disappearance. This period will hereinafter be referred to as a period 2.

The behavior of dispersion of the gas in the surrounding medium is expressed by the dispersion equation of the following Expression 3.

$$\frac{\partial c}{\partial t} + \nabla \cdot (-D\nabla c) = O \qquad \text{[Expression 3]}$$

Here, D indicates a dispersion coefficient, and c indicates a concentration of gaseous molecules in a medium and corresponds to the number n of molecules per unit volume.

In order to calculate dispersion of tens of thousands of air bubbles distributed within a shot, there is an inherent need to solve Expression 3 by dividing tens of thousands of air bubbles distributed within a shot and the surrounding medium using calculation grid cells having a size capable of analyzing an image of each air bubble. However, this requires a large number of calculation grid cells, and there is concern that a calculation time may not come within a realistic range.

On the other hand, the behavior of the air bubble pressure p, the air bubble radius r, and the mask height h at the time of disappearance of air bubbles shown in FIG. 4 is the same for any of the tens of thousands of air bubbles within a shot except that each air bubble has a different number ntrap of molecules at the time ttrap. For this reason, there is no need to calculate the behavior of dispersion of each air bubble by dividing the calculation grid cells such that images of tens of thousands of air bubbles within one shot can be analyzed, and the behavior of disappearance of tens of thousands of air bubbles within a shot can be ascertained if the behavior of air bubble dispersion of a single air bubble is calculated for each of the numbers ntrap of molecules in each air bubble.

In addition, in FIG. 4, the period 2 is sufficiently longer than the period 1. For this reason, it is important to calculate the behavior of air bubble dispersion during the period 2 for estimating a time necessary for disappearance of the air bubbles.

Figure 5:
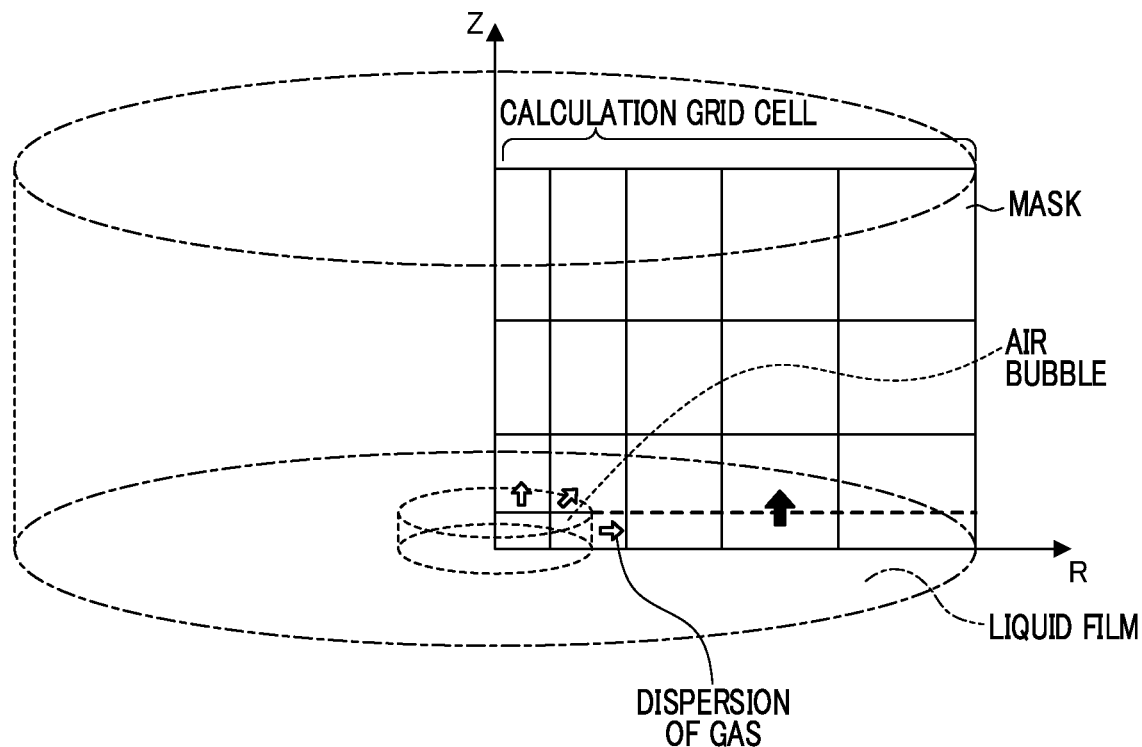
FIG. 5 is an example of calculation grid cells for calculating an air bubble disappearance database.

Here, with reference to FIG. 5, a method for finding the behavior of dispersion of gas from a single air bubble having an initial number nbubble, init of molecules during the period 2 on the basis of Expression 3 will be described. Expression 3 is solved using a difference method on calculation grid cells divided in three-dimensional directions. In the present Example, on the assumption that the air bubbles have a columnar shape, a columnar coordinate system is employed.

Accordingly, compared to a case in which the calculation grid cells is divided in the three-dimensional directions of X, Y, and Z, increase in the number of calculation grid cells can be curbed, and thus the calculation time can be reduced. In addition, regarding the calculation grid cells, the calculation amount may be reduced using an irregular interval grid.

The mask and the liquid film are considered as calculation targets. Regarding the dispersion coefficient D, each of a dispersion coefficient Dmsk of the molecular species constituting the gas with respect to the mask and a dispersion coefficient Dliquid thereof with respect to the liquid film is assumed. A calculation region may be set to an extent of approximately half the size of shot in a radial direction and an extent of approximately the mask thickness in a height direction. The liquid film thickness is referred to as hRLT which is a mask height during the period 2.

If Henry's law is established on a boundary surface between air bubbles and a medium, a concentration c0 of gaseous molecules on the boundary surface between the air bubbles and the medium is expressed by the following Expression 4.

$$c_0 = S_o \cdot p \qquad \text{[Expression 4]}$$

Here, p indicates a pressure of the gas. Here, an air bubble pressure pbubble may be adopted. So indicates a solubility of the molecular species constituting the gas. Regarding the solubility So, each of a solubility Smsk of the molecular species constituting the gas with respect to the mask and a solubility Sliquid thereof with respect to the liquid film is assumed.

Figure 6:
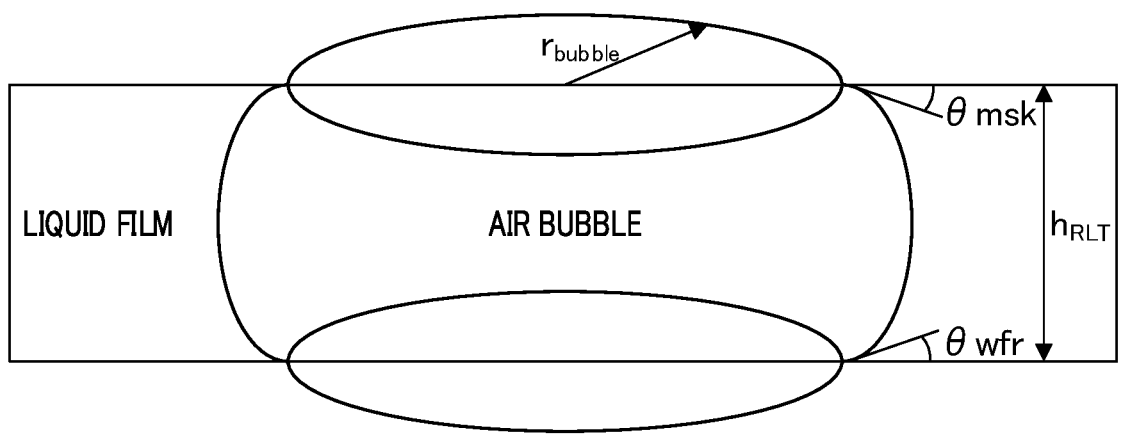
FIG. 6 is a view for describing an air bubble pressure.

The air bubble pressure pbubble is expressed by the following Expression 5 as in FIG. 6.

$$p_{bubble} = \gamma \left( \frac{\cos \theta_{msk} + \cos \theta_{wfr}}{h_{RLT}/2} + \frac{1}{r_{bubble}} \right) + p_{atm} \qquad \text{[Expression 5]}$$

Here, $\gamma$ indicates a surface tension coefficient of a liquid, patm indicates an atmospheric pressure, $\theta$msk indicates a contact angle on the mask side, $\theta$wfr indicates a contact angle on the substrate side, and rbubble indicates an air bubble radius. The first member on the right side corresponds to the meniscus pressure. When Expression 3 is solved with c0 obtained from Expressions 4 and 5 as a boundary condition, a concentration c of gaseous molecules at each point in the calculation grid cells can be obtained.

A dispersion speed, that is, a flux f of gaseous molecules per unit time and unit area is expressed by the following Expression 6.

$$f = -D\nabla c \qquad \text{[Expression 6]}$$

The flux is calculated using Expression 6 from a gradient of the concentration c of gaseous molecules on the boundary surface between the air bubbles and the medium found on the calculation grid cells. A number dn/dt of molecules which disappear from the air bubbles per unit time is expressed by the following Expression 7 by multiplying this by an area A in which the air bubbles and the medium are in contact with each other.

$$\frac{dn}{dt} = f \cdot A \qquad \text{[Expression 7]}$$

Figures 7A, 7B:
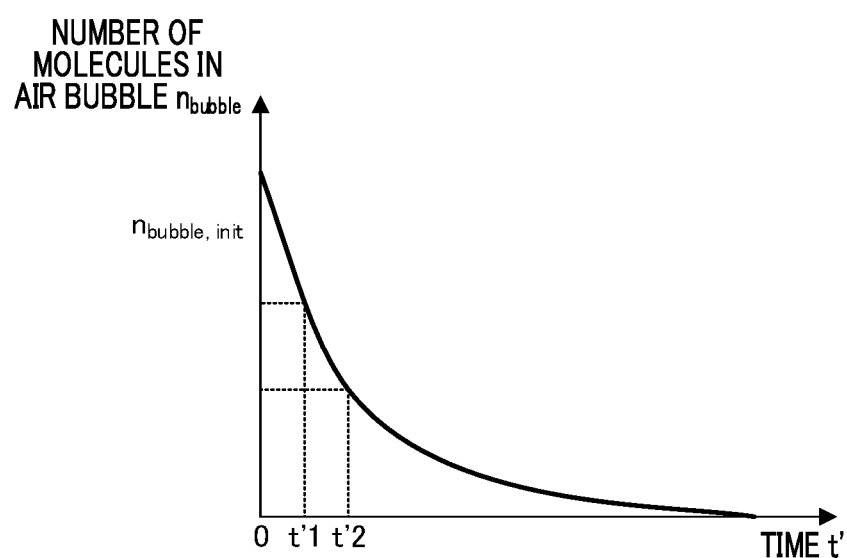
FIG. 7A is a view showing an example of an approximation function showing temporal change in the number of gaseous molecules in a single air bubble.
FIG. 7B is a view showing an example of a table showing a disappearance speed of gaseous molecules in a single air bubble.

A new number nbubble, new of gaseous molecules inside the air bubbles is obtained by reducing the number nbubble of gaseous molecules inside the air bubbles as much as dn/dt obtained by Expression 7. A database indicating a change in the number of gaseous molecules in a single air bubble having the initial number nbubble,init of molecules can be obtained as an approximation function, for example, by repeating this until the time when the air bubbles disappear. This is shown in FIG. 7A. Alternatively, a database indicating a disappearance speed of gaseous molecules in a single air bubble can be obtained as a table, for example. This is shown in FIG. 7B. From these, the behavior of disappearance of a single air bubble can be ascertained. The database may include a function as described above or may include a table.

Since gas may also be transmitted through the boundary surface between the mask and the liquid film, this may be taken into consideration. This is shown in FIG. 5 by the dark bold arrow. Transmission of the gas through the boundary surface between the mask and the liquid film can be taken into consideration by solving Expression 3 along with a condition that a flux entering the boundary surface from the liquid film side and a flux coming out from the boundary surface to the mask are equivalent to each other. Generally, the dispersion coefficient Dliquid with respect to a liquid film is sufficiently larger than the dispersion coefficient Dmsk with respect to a mask. Therefore, a situation in which the air bubbles disperse to the mask via the liquid film can also be taken into consideration.

The mask and the liquid film have been considered as calculation targets so far, but the gas may also disperse to the medium on the substrate side. In this case, dispersion in the medium on the substrate side may also be taken into consideration. For instance, if the behavior to the medium on the substrate side is also expressed by Expression 3, the behavior may be found on a new assumption of the dispersion coefficient or the solubility with respect to the medium on the substrate side. Alternatively, if the medium on the substrate side is a porous medium, the behavior may be found additionally on the assumption of the porosity.

In description up to now, gaseous molecules of one kind have been adopted, but gaseous molecules of a plurality of kinds may be adopted. When dispersion of air bubbles using Expression 3 is calculated, proportions of the molecular species of the gas may be added as input values. Thereafter, the behavior of dispersion for each of the molecular species of the gas may be individually calculated such that the gas disappears from the same molecular species inside the air bubbles at the disappearance speed obtained for each of the molecular species of the gas.

Accordingly, for example, if the gas is air, nitrogen and oxygen are discriminated, and thus the behavior of disappearance of air bubbles can be ascertained.

In addition, the period 1 in FIG. 4 has not been taken into consideration so far, but the period 1 can also be taken into consideration. In addition to the physical property values which have been assumed so far, the period 1 can be taken into consideration by assuming the viscosity of the liquid film. Accordingly, since the amount of disappeared air bubbles during the period 1 can also be taken into consideration, more accurate behavior of disappearance of air bubbles can be ascertained.

The behavior of disappearance of a single air bubble for each air bubble included in the entire shot can be ascertained by performing the foregoing calculation for each of the numbers ntrap of molecules of the air bubbles trapped between droplets as many times as the number of air bubbles, that is, tens of thousands of times while having the number nbubble,init of molecules at a calculation start time as ntrap. However, even in this case, there is concern that calculation time may not come within a realistic range.

The number ntrap of molecules in air bubbles is expressed by Expression 1 using the air bubble pressure ptrap and the air bubble volume Vtrap. Here, the air bubble pressure ptrap is approximately equivalent to the atmospheric pressure.

The unevenness within the shot is merely a pressure difference caused by a flow resistance at the time when the gas escapes through a flow channel formed by the mask, the substrate, and droplets. In addition, the air bubble volume Vtrap indicates a volume formed by the mask, the substrate, and droplets at the moment when the gas is trapped. The unevenness within a shot is merely a volume difference caused by a density of the disposed droplets. For this reason, it is expected that the number ntrap of molecules in air bubbles are distributed within approximately a certain range even in any air bubble within a shot.

Here, the behavior of air bubble dispersion of a single air bubble with respect to nmin considered as a lower limit and nmax considered as an upper limit for the number ntrap of molecules in the air bubbles is calculated. In this manner, a database of a series of the numbers of molecules indicating the number nbubble of molecules for each time with respect to the air bubbles of the initial numbers nmin and nmax of molecules can be obtained. Alternatively, a database of a series of air bubble disappearance speeds indicating the disappearance speed dn/dt of the air bubbles for each time indicated by Expression 7 may be obtained. A solution which can be directly obtained by solving Expression 3 is the air bubble disappearance speed, which is desirable.

The behavior of disappearance of air bubbles can also be ascertained regarding any ntrap included between nmin and nmax using an interpolated database indicating the behavior of disappearance of air bubbles obtained in this manner.

In order to simplify the description, calculation has been performed with respect to two numbers of molecules such as nmin and nmax up to now. However, if the database obtained from only the two numbers of molecules is interpolated, there is concern that the accuracy may deteriorate.

For this reason, a database may be prepared by performing calculation for each of the numbers of molecules which are further divided into a range from 10 to 100 between nmin and nmax. The degree of division may be suitably determined depending on the balance between the calculation time and the accuracy which can be permitted.

A method for finding the behavior of disappearance of tens of thousands of air bubbles within a shot will be described using the air bubble disappearance database obtained as described above.

In the imprinting device of the present Example, since imprinting is performed by causing the mask to swell due to a cavity pressure, filling of droplets proceeds from the center of a shot toward the outer side of the shot. For this reason, the time trap when air bubbles are formed comes early in the air bubbles at the center of a shot and comes late in the air bubbles on the outer side of the shot. In addition, the air bubble pressure ptrap and the air bubble volume Vtrap also differ for each air bubble.

In order to take these influences into consideration, at the time of calculation of the behavior of filling with droplet, when gas is trapped in the droplets and an ith air bubble is formed, a time ttrap_i thereof is stored. In addition, an air bubble pressure ptrap_i and an air bubble volume Vtrap_i at the time thereof and coordinates x_i and y_i within a shot in the air bubbles thereof are stored.

This is performed with respect to all the tens of thousands of the air bubbles formed within a shot. Here, a number ntrap_i of molecules in the air bubbles is calculated by Expression 1 from the air bubble pressure ptrap_i and the air bubble volume Vtrap_i which have been stored.

The air bubble disappearance database which has been preliminarily prepared is interpolated, and the behavior of disappearance of the air bubbles of the initial number ntrap_i of molecules is obtained. However, the air bubble disappearance database is calculated while having the time when the air bubbles are trapped as a time 0, the time is offset such that this becomes ttrap_i. The behavior of disappearance of all the air bubbles within a shot can be ascertained by repeating this for all the tens of thousands of air bubbles.

Figure 8A:
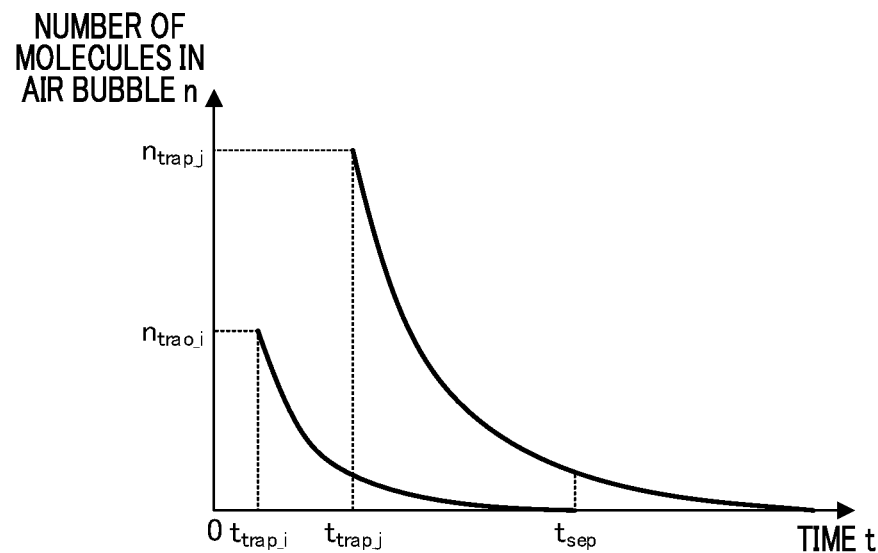
FIG. 8A is a view describing behavior of disappearance of air bubbles in Example 1.

FIG. 8A schematically shows the results. For the sake of convenience of illustration, only two air bubbles such as an ith air bubble and a jth air bubble are shown.

Figure 8B:
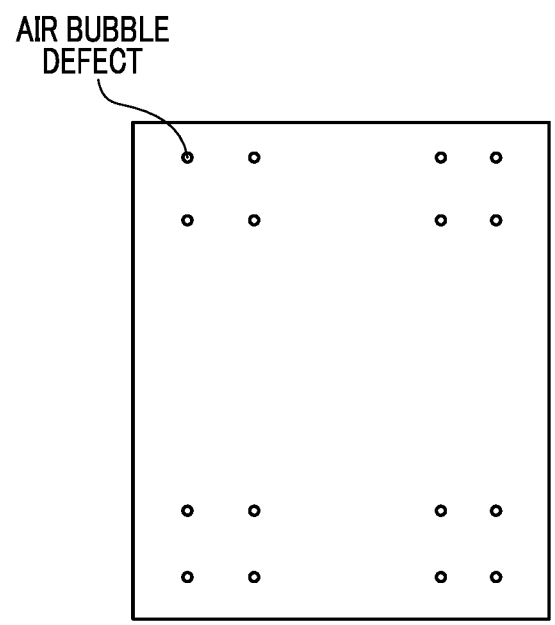
FIG. 8B is a view showing an example of a distribution of air bubble defects within a shot.

Focusing on a time tsep at the time of mold release, the number of molecules in the ith air bubble has already become zero. On the other hand, it is possible to ascertain that the number of molecules in the jth air bubble has not yet become zero and there remain air bubbles. In this case, it is possible to ascertain that the ith air bubble does not become an air bubble defect but the jth air bubble will become an air bubble defect. At the time tsep at the time of mold release, a map of air bubble defects as in FIG. 8B can be obtained by plotting air bubbles of which the number of molecules in the air bubble has not yet become zero on the basis of the stored coordinates of the air bubbles within a shot. In this manner, a distribution of air bubble defects within a shot can be estimated.

Example 2

Figure 3A:
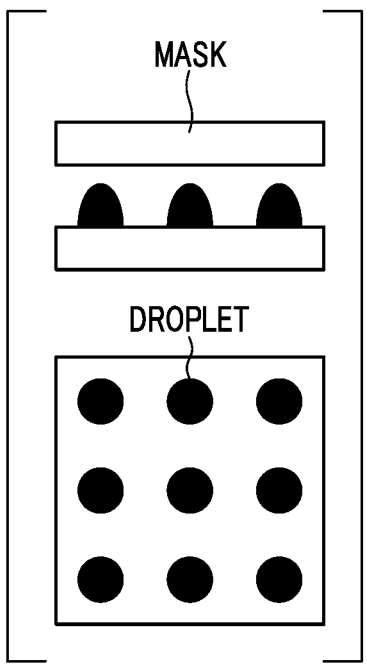
FIGS. 3A to 3E are schematic views sequentially showing formation of air bubbles and behavior of disappearance.
Figure 3B:
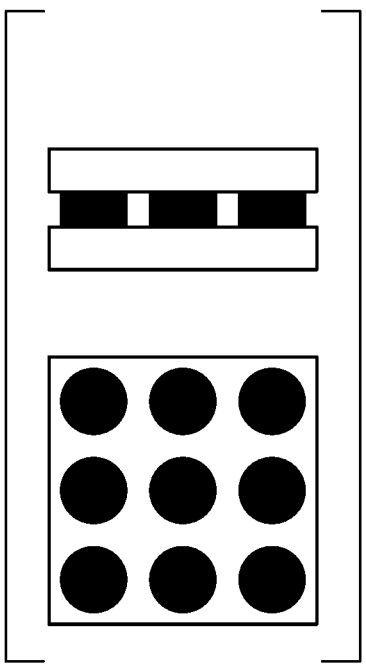
Figure 3C:
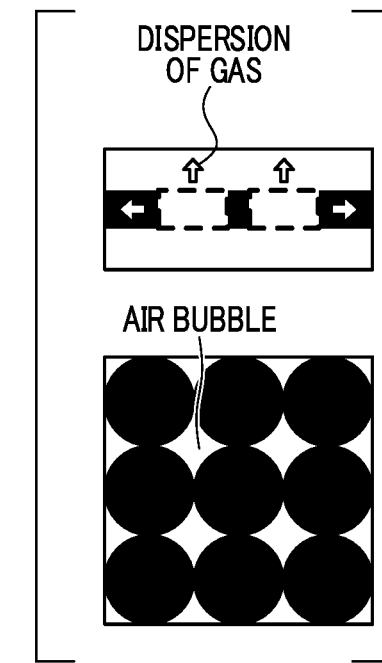
Figure 3D:
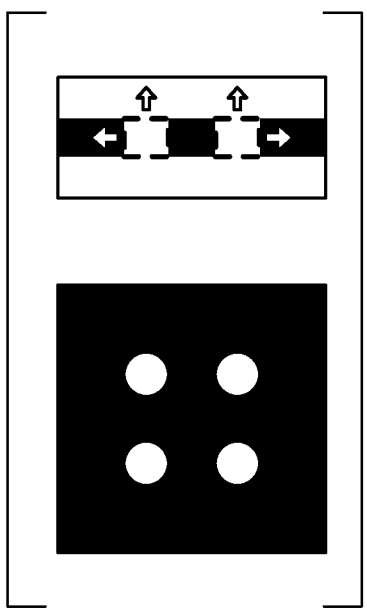
Figure 3E:
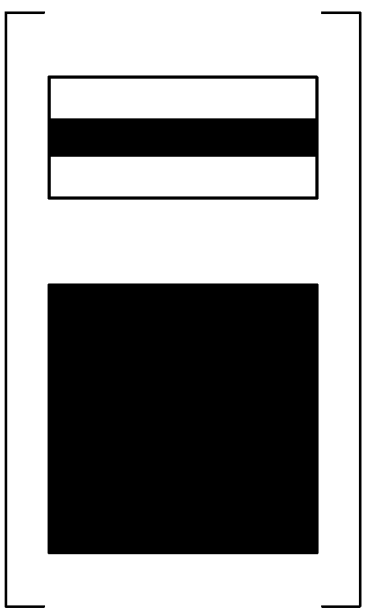

Example 2 further differs from Example 1 in that dissolution and dispersion of gas are also calculated before the gas is trapped in droplets. That is, in Example 1, it is considered that air bubbles dissolve and disperse in the mask or the liquid film only in a state in which the gas shown in FIGS. 3C to 3D is trapped between the droplets and becomes air bubbles. However, even in a state before the air bubbles shown in FIGS. 3A to 3B are trapped in the droplets, the gas may dissolve and disperse in the mask or the liquid film. The calculation accuracy of the behavior of disappearance of air bubbles can be further enhanced by taking this into consideration.

However, in the gas before being trapped in the droplets, the pressure thereof changes hourly due to the influence of the behavior of the mask at the time of imprinting. In addition, it also changes depending on the place within a shot due to the density of the disposed droplets. For this reason, a technique of making a database used after air bubbles are trapped cannot be employed. Here, there is a need to employ a different technique.

Figure 9:
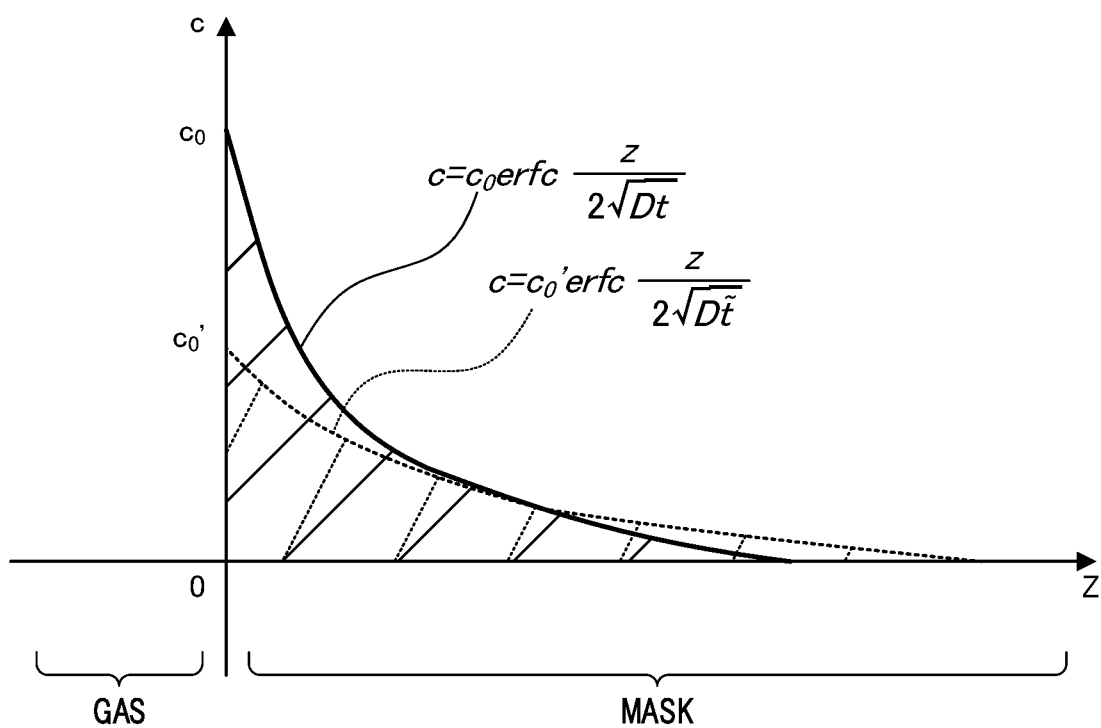
FIG. 9 is a view for describing calculation of the behavior of dispersion before gas becomes air bubbles.

With reference to FIG. 9, a method for handling dissolution and dispersion with respect to the mask will be described.

As solved in Example 1, originally, dispersion of gas in the mask occurs in a three-dimensional manner. However, it is conceivable that adjacent gas regions be in contact with each other and dispersion of the gas in each of the gas regions occur in a one-dimensional manner in the mask thickness direction before the gas is trapped in droplets. Here, the dispersion approximates one-dimensional dispersion.

When Expression 3 is solved while having a mask as a one-dimensional semi-infinite body, the mask thickness direction as the Z direction, and the concentration of gaseous molecules on the boundary surface between the gas and the mask as c0, an analytic solution can be obtained as in the following Expression 8.

$$c = c_O \text{erfc}\left(\frac{z}{2\sqrt{Dt}}\right) \qquad \text{[Expression 8]}$$

Here, erfc indicates a complementary error function. Expression 8 expresses the distribution of the concentration of gaseous molecules inside the mask at a time t. The distribution of the concentration of gaseous molecules inside the mask can be ascertained without dividing the mask in calculation grid cells by utilizing this analytic solution.

A gradient (boundary surface between the gas and the mask) of the concentration c of gaseous molecules at this time when Z=0 is the flux f at the time t.

From Expressions 6 and 8, the flux f is estimated by the following Expression 9.

$$f = -D\frac{\partial c}{\partial z}\bigg|_{z=O} = -c_O\sqrt{\frac{D}{\pi t}} \qquad \text{[Expression 9]}$$

A value obtained by Expression 7 in which this flux is multiplied by the area where the gas and the mask are in contact with each other indicates dispersion in the mask per unit time. In this manner, dispersion of the gas in the mask can be found without dividing the mask in calculation grid cells.

However, as described above, in the gas before being trapped in droplets, the pressure thereof changes hourly due to the influence of the behavior of the mask at the time of imprinting. From Expression 4, if the pressure of the gas changes, the concentration c0 of gaseous molecules on the boundary surface between the gas and the mask also changes. For this reason, there is a need to consider a case in which c0 changes.

On the assumption that imprinting starts at the time 0, a situation after the gas has dispersed in the mask until the time t will be considered.

While having the concentration of gaseous molecules on the boundary surface between the gas and the mask at this time as c0', it is considered that the flux can be written in a form similar to that of Expression 9. Due to dispersion of the gas until the time t, gaseous molecules have already dispersed inside the mask. The distribution of the concentration of gaseous molecules inside the mask at this time also differs from the molecular concentration distribution when the gas disperses in the mask until the time t at a concentration c0' of gaseous molecules on the boundary surface between the gas and the mask.

Here, virtual times t and so on are introduced, and a flux f' is expressed by the following Expression 10.

$$f' = -D\frac{\partial c}{\partial z}\bigg|_{z=O} = -c'_O\sqrt{\frac{D}{\pi t}}$$ [Expression 10]

The virtual times t and so on may be determined such that the following Expression 11 is satisfied in order to retain the total number n of gaseous molecules which have dispersed in the mask until the time t.

$$n = \int_O^\infty c_O \text{erfc}\left(\frac{z}{2\sqrt{Dt}}\right)dz = \int_O^\infty c'_O \text{erfc}\left(\frac{z}{2\sqrt{Dt}}\right)dz$$ [Expression 11]

This corresponds to a situation in which the areas with hatching of the solid lines and the dotted lines in FIG. 9 are equivalent to each other.

A value obtained by Expression 7 in which the flux f' expressed by Expression 10 is multiplied by the area where the gas and the mask in contact with each other indicates dispersion in the mask per unit time. In this manner, even if c0 changes, dispersion of the gas in the mask can be found without dividing the mask in calculation grid cells. If the dispersion from when imprinting has started until the time ttrap when the gas is trapped in droplets and becomes air bubbles is integrated, a number nsol,msk of molecules of the gas which has dispersed in the mask until the time ttrap is estimated.

Next, a method for handling dissolution and dispersion with respect to droplets will be described. Dispersion in droplets may also be handled in a manner similar to that of the mask. However, generally, dispersion with respect to droplets is sufficiently faster than dispersion with respect to the mask. Here, as the gas starts to disperse, the entire droplets may immediately reach the concentration c0 of gaseous molecules on the boundary surface between the gas and the droplets. In this manner, a number nsol,liquid of molecules of the gas which disperse in the droplets before the gas is trapped in the droplets can be estimated in a manner easier than the case of the mask.

A number nsol of gaseous molecules which have dispersed in the surrounding medium until the gas is trapped in the droplets is obtained by adding nsol,msk and nsol,liquid.

Figure 10:
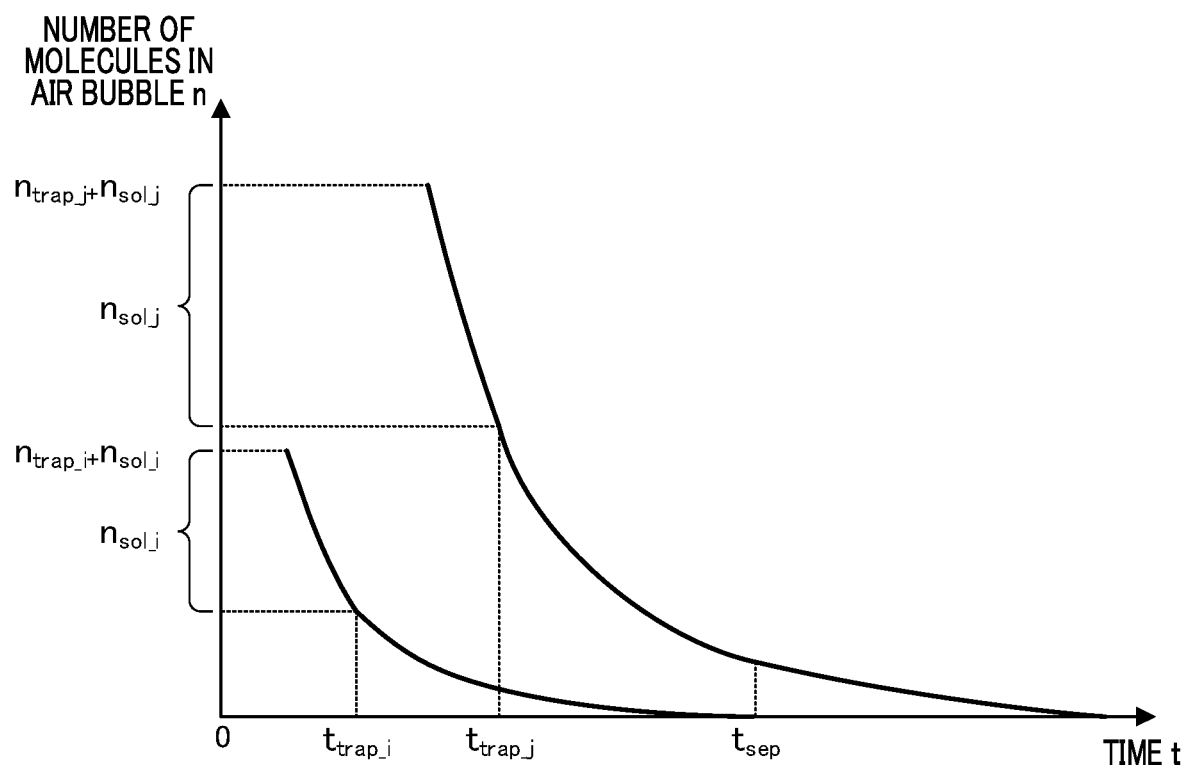
FIG. 10 is a view describing a method in which an air bubble disappearance database is referred to in Example 2.

With reference to FIG. 10, a method for using the air bubble disappearance database in Example 2 will be described. If the gas has dispersed in the surrounding medium until droplets are trapped, there is a need to consider an effect that the disappearance speed of the gaseous molecules decreases due to the gas which has already dispersed. For this reason, at the time of calculation of the behavior of filling with droplets, when gas is trapped in the droplets and the ith air bubble is formed, nsol_i is further stored in addition to that indicated in Example 1.

When an interpolated air bubble disappearance database is used, the behavior of disappearance of air bubbles of an initial number ntrap_i+nsol_i of molecules is calculated instead of calculating the behavior of disappearance of air bubbles of the initial number ntrap_i of molecules as in Example 1. Moreover, in Example 1, the time is offset such that the time 0 of the air bubble disappearance database becomes the time ttrap. However, in the present Example, the time is offset such that a time, at which the disappearance amount of the air bubbles in the air bubble disappearance database becomes nsol, becomes the time ttrap. Consequently, the effect that the disappearance speed of the gaseous molecules decreases due to the gas which has already dispersed can be taken into consideration.

As described above, the present Example includes a fourth step of calculating the number of gaseous molecules which have dissolved around the air bubbles until the time when the air bubbles are trapped, and thus a disappearing process of the air bubbles can be corrected in accordance with the number of dissolved gaseous molecules.

Accordingly, it is possible to calculate the behavior of disappearance of air bubbles in one entire shot in which dispersion of the gas before being trapped in droplets is taken into consideration.

Example 3

Figure 11:
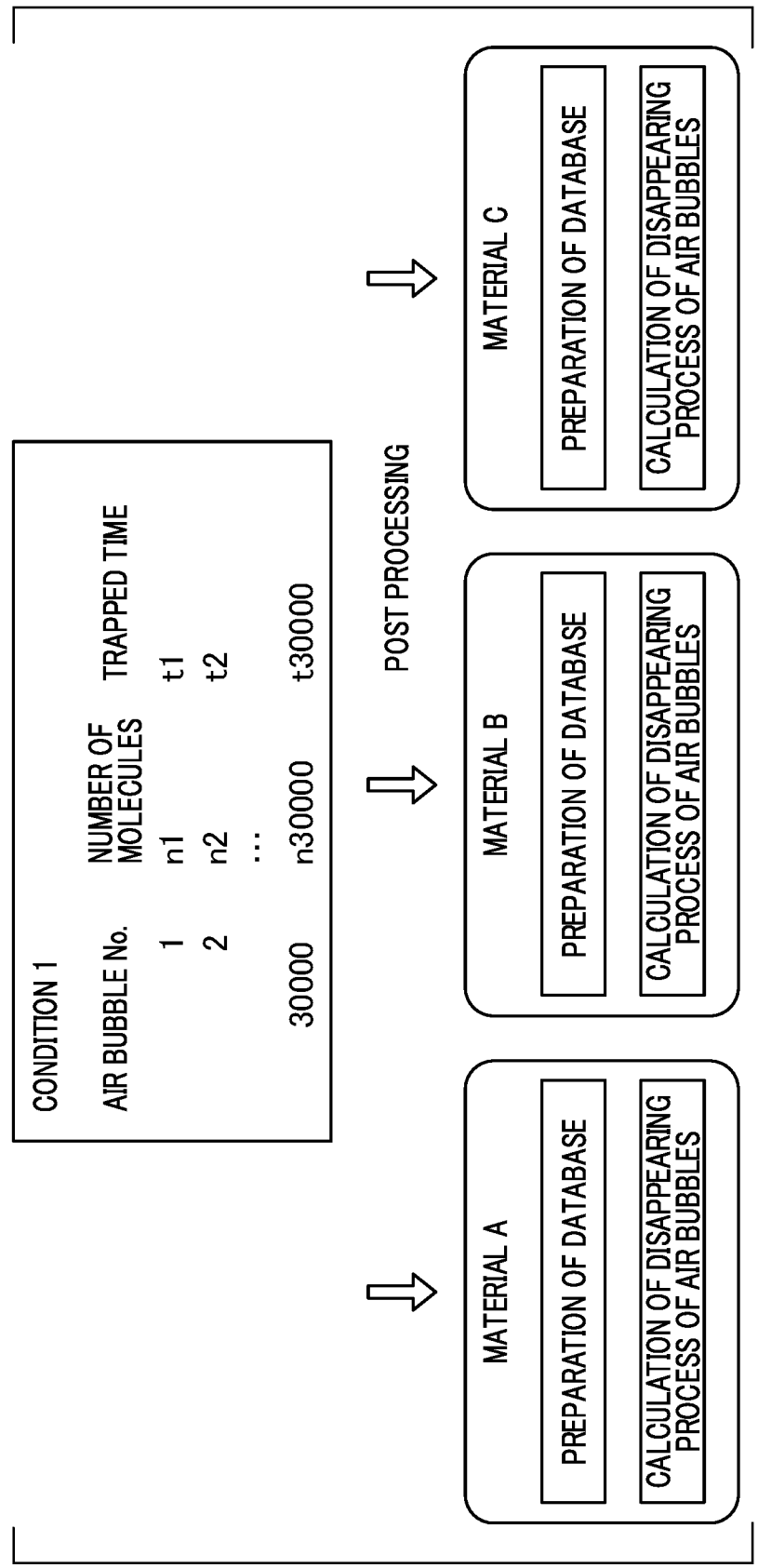
FIG. 11 is a view for describing Example 3.

With reference to FIG. 11, Example 3 will be described. Example 3 further differs from Examples 1 and 2 in that calculation of the behavior of disappearance of air bubbles is performed as a post processing of calculation of the behavior of filling. In calculation of the behavior of filling, the trapped time trap, the air bubble pressure ptrap, an air bubble volume vtrap, the number nsol of gaseous molecules that have been dispersed in advance, which are stored for each air bubble, are determined depending on device parameters such as disposition of droplets or behavior of imprinting. On the other hand, regarding the calculation of the behavior of disappearance of air bubbles performed as the post processing in the present Example, the disappearing process of the air bubbles is calculated by designating the physical property value of the surrounding medium or the species of gas and preparing the air bubble disappearance database.

That is, the second step of obtaining the disappearing process of each air bubble and the third step of preparing the database are performed as a post processing of the first step.

Consequently, if the material on a side of the substrate (surrounding medium) has changed, only the post processing part may be calculated again, and there is no need to recalculate the trapped time, the air bubble pressure, the air bubble volume, and the like which can be obtained from calculation of the behavior of filling. For this reason, an influence in a case in which the material has changed can be easily estimated compared to a case in which the post processing is not adopted.

Figure 12:
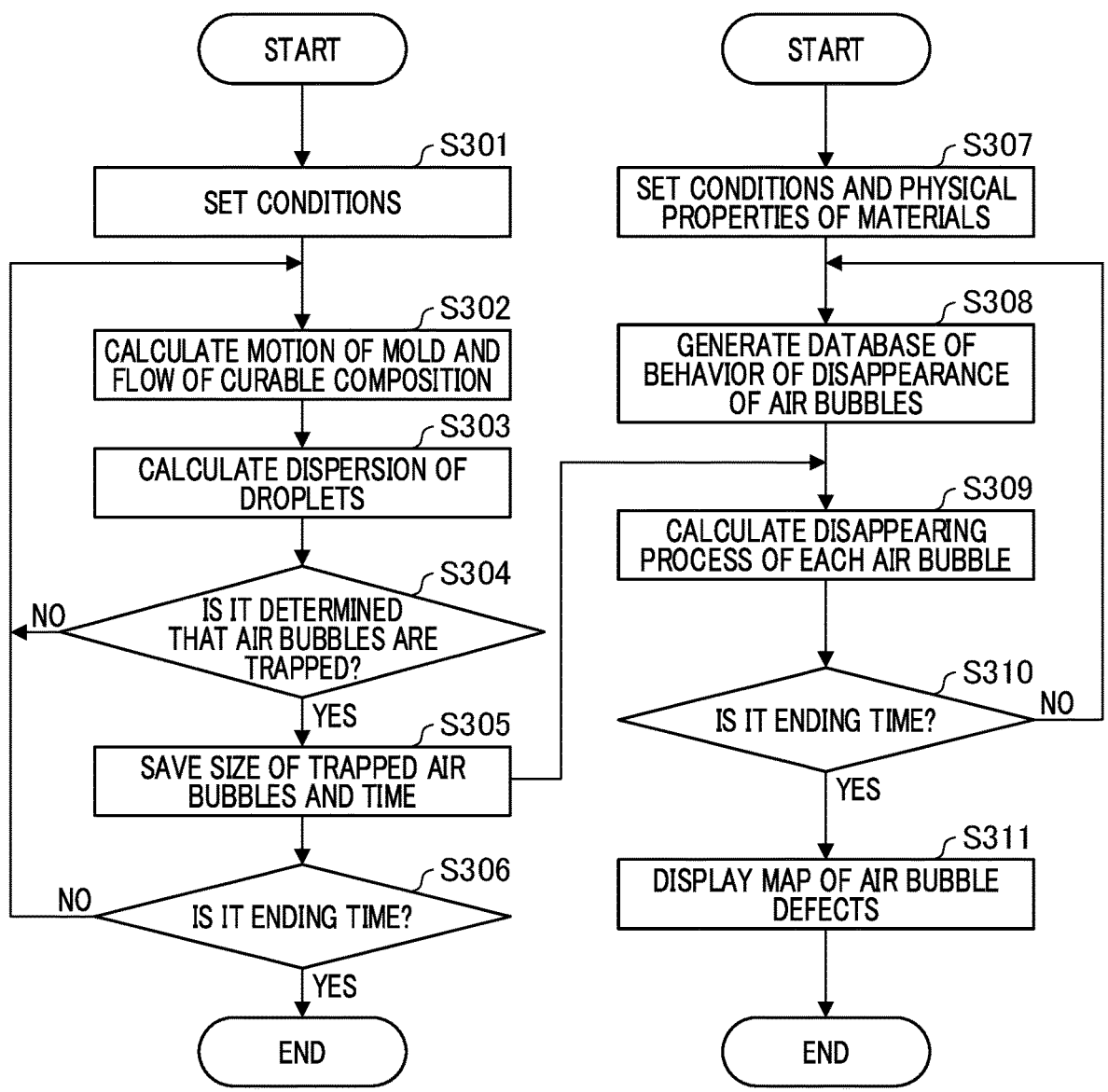
FIG. 12 is a flowchart for describing an example of a processing flow in the Examples.

FIG. 12 is a flowchart showing an example of a processing flow in Example.

In FIG. 12, on the left side, a process for computing the size of each air bubble at the time when air bubbles become trapped due to a mold brought into contact therewith and the time of becoming trapped is shown. On the right side, a process of preliminarily preparing a database in which the disappearing process of the air bubbles is calculated with respect to a predetermined size of the air bubbles at the time when the air bubbles are trapped and calculating the disappearing process in accordance with the size of each air bubble is shown.

In Step S301, for example, the kinds of the curable composition, the mold (mask), and the like, various physical property values, various parameters in Expressions 1 to 11, and the like are set for a simulation.

In Step S302, motion of the mold and a flow of the curable composition (uncured resin) are calculated. In Step S303, dispersion of droplets is calculated. In Step S304, it is determined whether or not air bubbles are trapped in a case in which the mold come into contact with the droplets. If No, the procedure returns to Step S302. If Yes, in Step S305, the size of the trapped air bubbles and the time when they are trapped are saved.

Here, Step S305 corresponds to the first step of computing the size of each air bubble at the time when air bubbles become trapped due to the mold brought into contact therewith and the time of becoming trapped. Next, in Step S306, an ending time is distinguished, and when the answer is Yes, the procedure ends. When the answer is No, the procedure returns to Step S302.

On the other hand, in Step S307, in order to prepare a database, for example, the kinds of the curable composition, the mold (mask), and the like, various physical property values of the materials, various parameters in Expressions 1 to 11, and the like are set.

The parameters include the solubility and the dispersion coefficient of gas included in the air bubbles, the surface tension of the curable composition, and the like with respect to at least one of the mold and the resin. In addition, the parameters may include the solubility and the dispersion coefficient of gas, the viscosity of the curable composition, the kind of the gas included in the air bubbles, the molecular concentration of the gas included in the air bubbles with respect to a base layer formed on the substrate.

In Step S308, the database of the disappearing process of the air bubbles related to the conditions set in Step S307 and the physical property value is generated.

Here, Step S308 corresponds to the third step of preliminarily preparing a database in which the disappearing process of the air bubbles is calculated with respect to a predetermined size of the air bubbles at the time when the air bubbles are trapped.

In Step S309, with comparative reference to the size of the trapped air bubbles and the time when they are trapped which have been saved in Step S305 and the database prepared in Step S308, the disappearing process of each of the air bubbles is calculated on the basis of information of the size of each air bubble and the time.

Here, Step S309 corresponds to the second step of calculating the disappearing process of each of the air bubbles on the basis of information of the size of each air bubble and the time. In Step S310, it is distinguished whether the time has reached the ending time, and when the answer is No, the procedure returns to Step S308 and the database is updated.

When the answer is Yes, the procedure proceeds to Step S311, and a map of the disappearing process of each air bubble is displayed in a two-dimensional manner with respect to a plurality of air bubbles.

That is, a map of the disappearing process of each air bubble is displayed in a two-dimensional form in accordance with the positions of a plurality of air bubbles. Alternatively, the size of each air bubble at a predetermined point in time may be displayed in a two-dimensional form in accordance with the positions of a plurality of air bubbles. Alternatively, as in FIG. 8B, remaining air bubbles having a size larger than a predetermined size at the time when the mold is separated from the curable composition may be displayed as air bubble defects in a two-dimensional manner.

Thereafter, the procedure ends at a suitable timing. That is, Step S311 corresponds to a displaying step of displaying the disappearing process of each air bubble in a two-dimensional form in accordance with the positions of a plurality of air bubbles or displaying the size of each air bubble at a predetermined point in time in a two-dimensional form in accordance with the positions of a plurality of air bubbles.

According to the configuration described above, it is possible to easily simulate the degree of the sizes of air bubbles and the positions where they remain when the mold is separated from the curable composition. Therefore, positions of defects caused by the air bubbles can be checked in advance, and thus various kinds of materials and the physical property value can be suitably reselected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the calculation explained in the embodiments includes obtaining a calculated result from a database.

In addition, a computer program for realizing the functions of the Example described above for a part or all the control in the present Example may be supplied to a motor drive device via a network or various storage devices. Further, a computer (alternatively a CPU, an MPU, or the like) in the motor drive device may read and execute a program. In such a case, the program and the storage device storing the program constitute the present invention.

This application claims the benefit of Japanese Patent Application No. 2019-233215 filed on Dec. 24, 2019, which is hereby incorporated by reference herein in its entirety.

What is claimed is:

1. A computer-implemented method for simulating a film forming process of forming a film by arranging a curable composition in a form of a plurality of droplets on a substrate and bringing a mold into contact therewith, the method comprising:

a first step of computing (i) a size of each of a plurality of air bubbles at a time when the plurality of air bubbles become trapped, due to the mold being brought into contact with the plurality of droplets, and (ii) a time of becoming trapped due to the mold being brought into contact with the plurality of droplets such that a first air bubble of the plurality of air bubbles has a first computed time of becoming trapped, and a second air bubble of the plurality of air bubbles has a second computed time of becoming trapped that occurs later than the first computed time of becoming trapped; and a second step of obtaining a disappearing process of each of the plurality of air bubbles on a basis of (iii) information of the size of each of the plurality of air bubbles and (iv) the time when the plurality of air bubbles become trapped due to the mold being brought into contact with the plurality of droplets such that the first air bubble of the plurality of air bubbles having the first computed time of becoming trapped has a first disappearing process, and the second air bubble of the plurality of air bubbles having the second computed time of becoming trapped has a second disappearing process different from the first disappearing process, wherein the process of forming the film comprises:

arranging a plurality of droplets of the curable composition on the substrate;

bringing the plurality of droplets of the curable composition arranged on the substrate into contact with the mold; and forming, based on the obtaining, the film of the curable composition from the plurality of droplets on the substrate.

2. The method according to claim 1, further comprising: a third step of preliminarily preparing a database in which the disappearing process of each of the plurality of air bubbles is obtained with respect to a predetermined size of each of the plurality of air bubbles at the time when the plurality of air bubbles are trapped.

3. The method according to claim 2, wherein the database includes a function.

4. The method according to claim 2, wherein the database includes a table.

5. The method according to claim 2, wherein in the second step, the disappearing process of each of the plurality of air bubbles is obtained on the basis of the information of the size of each of the plurality of air bubbles and the time with reference to the database prepared in the third step.

6. The method according to claim 1, further comprising an outputting step of outputting the disappearing process of each of the plurality of air bubbles obtained in the second step in accordance with positions of the plurality of air bubbles, the outputting step including a displaying step of displaying the disappearing process of each of the plurality of air bubbles obtained in the second step in a two-dimensional form in accordance with the positions of the plurality of air bubbles.

7. The method according to claim 6, wherein in the displaying step, the size of each of the plurality of air bubbles at a predetermined point in time obtained in the second step is displayed in a two-dimensional form in accordance with the positions of the plurality of air bubbles.

8. The method according to claim 1, wherein the size of each of the plurality of air bubbles is expressed by a total number of gaseous molecules included in each of the plurality of air bubbles.

9. The method according to claim 1, further comprising: a fourth step of obtaining the number of gaseous molecules dissolved around each of the plurality of air bubbles until a time when the plurality of air bubbles are trapped, wherein the disappearing process of each of the plurality of air bubbles is corrected depending on the number of dissolved gaseous molecules.

10. The method according to claim 2, wherein the database includes, as parameters, a solubility and a dispersion coefficient of gas included in each of the plurality of air bubbles and a surface tension of the curable composition with respect to at least one of the mold and the curable composition.

11. The method according to claim 2, wherein the database includes, as parameters, a solubility and a dispersion coefficient of gas with respect to a base layer formed on the substrate.

12. The method according to claim 2, wherein the database includes, as a parameter, a viscosity of the curable composition.

13. The method according to claim 2, wherein the database includes, as parameters, kinds of gas included in each of the plurality of air bubbles.

14. The method according to claim 2, wherein the database includes, as a parameter, a molecular concentration of gas included in each of the plurality of air bubbles.

15. The method according to claim 2, wherein the second step of obtaining the disappearing process of each of the plurality of air bubbles and the third step of preparing the database are performed as a post processing of the first step.

16. The method according to claim 1, wherein the film forming process includes an imprinting process.

17. The method according to claim 1, wherein the film forming process includes a flattening process.

18. A non-transitory computer-readable storage medium that stores a computer program for a computer-implemented method for forming a film by arranging a curable composition in a form of a plurality of droplets on a substrate and bringing a mold into contact therewith, the computer-implemented method comprising:

a first step of computing (i) a size of each of a plurality of air bubbles at a time when the plurality of air bubbles become trapped, due to the mold being brought into contact with the plurality of droplets, and (ii) a time of becoming trapped due to the mold being brought into contact with the plurality of droplets such that a first air bubble of the plurality of air bubbles has a first computed time of becoming trapped, and a second air bubble of the plurality of air bubbles has a second computed time of becoming trapped that occurs later than the first computed time of becoming trapped; and a second step of obtaining a disappearing process of each of the plurality of air bubbles on a basis of (iii) information of the size of each of the plurality of air bubbles and (iv) the time when the plurality of air bubbles become trapped due to the mold being brought into contact with the plurality of droplets such that the first air bubble of the plurality of air bubbles having the first computed time of becoming trapped has a first disappearing process, and the second air bubble of the plurality of air bubbles having the second computed time of becoming trapped has a second disappearing process different from the first disappearing process, wherein the process of forming the film comprises:

arranging a plurality of droplets of the curable composition on the substrate;

bringing the plurality of droplets of the curable composition arranged on the substrate into contact with the mold; and forming, based on the obtaining, the film of the curable composition from the plurality of droplets on the substrate.

19. An apparatus for forming a film by arranging a curable composition in a form of a plurality of droplets on a substrate and bringing a mold into contact therewith and including at least one processor or circuit configured to:

compute (i) a size of each of a plurality of air bubbles at a time when the plurality of air bubbles become trapped, due to the mold being brought into contact with the plurality of droplets, and (ii) a time of becoming trapped due to the mold being brought into contact with the plurality of droplets such that a first air bubble of the plurality of air bubbles has a first computed time of becoming trapped, and a second air bubble of the plurality of air bubbles has a second computed time of becoming trapped that occurs later than the first computed time of becoming trapped; and obtain a disappearing process of each of the plurality of air bubbles on a basis of information of the size of each of the plurality of air bubbles and (iv) the time when the plurality of air bubbles become trapped due to the mold being brought into contact with the plurality of droplets such that the first air bubble of the plurality of air bubbles having the first computed time of becoming trapped has a first disappearing process, and the second air bubble of the plurality of air bubbles having the second computed time of becoming trapped has a second disappearing process different from the first disappearing process, wherein in the forming of the film, the apparatus:

arranges a plurality of droplets of the curable composition on the substrate;

brings the plurality of droplets of the curable composition arranged on the substrate into contact with the mold; and forms, based on the obtained disappearing process of each of the plurality of air bubbles, the film of the curable composition from the plurality of droplets on the substrate.

* * * * *